US012639064B2

(12) United States Patent
Paez et al.

(10) Patent No.: US 12,639,064 B2
(45) Date of Patent: May 26, 2026

(54) TRANSLATING BETWEEN VERSIONS OF DATA OBJECT SCHEMAS FOR DATA PRODUCERS AND DATA CONSUMERS

(71) Applicant: Amazon Technologies, Inc., Seattle, WA (US)

(72) Inventors: Dayan Paez, Westborough, MA (US); Matthew Roy Noble, Seattle, WA (US); Nirupama Lakshmi Kumar, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/489,500

(22) Filed: Sep. 29, 2021

(65) Prior Publication Data

US 2023/0095852 A1    Mar. 30, 2023

(51) Int. Cl.
| | |
|---|---|
| *G06F 8/71* | (2018.01) |
| *G06F 8/20* | (2018.01) |
| *G06F 8/65* | (2018.01) |
| *G06F 8/73* | (2018.01) |
| *H04L 67/1087* | (2022.01) |

(52) U.S. Cl.
CPC .................. *G06F 8/71* (2013.01); *G06F 8/24* (2013.01); *G06F 8/65* (2013.01); *G06F 8/73* (2013.01); *H04L 67/1087* (2013.01)

(58) Field of Classification Search
CPC ..... G06F 8/71; G06F 8/24; G06F 8/65; G06F 8/73; H04L 67/1087
USPC ........................................ 717/170
See application file for complete search history.

(56) References Cited

U.S. PATENT DOCUMENTS

| | | | | |
|---|---|---|---|---|
| 6,119,130 | A  * | 9/2000 | Nguyen ................ | G06F 16/213 |
| | | | | 707/999.203 |
| 6,341,291 | B1 | 1/2002 | Bentley et al. | |
| 7,814,142 | B2 | 10/2010 | Mamou et al. | |
| 10,621,156 | B1 * | 4/2020 | Morkel .............. | G06F 16/2393 |
| 10,706,166 | B1 * | 7/2020 | Mandadi ............ | G06F 16/2379 |
| 10,929,122 | B1 * | 2/2021 | Goodwin ................ | G06F 8/656 |
| 2005/0119871 | A1 * | 6/2005 | Deffler .................. | G06F 16/289 |
| | | | | 703/22 |

(Continued)

FOREIGN PATENT DOCUMENTS

EP          0998713 B1    11/2005

OTHER PUBLICATIONS

International Search Report and Written Opinion mailed Jan. 11, 2023 in PCT/US2022/077059, Amazon Technologies, Inc., pp. 1-16.

(Continued)

*Primary Examiner* — Thuy Dao
*Assistant Examiner* — Zengpu Wei
(74) *Attorney, Agent, or Firm* — S. Scott Foster; Kowert, Hood, Munyon, Rankin & Goetzel, P.C.

(57) ABSTRACT

Translations between versions of data object schemas may be performed between data object producers and data object consumers. A request to update a data object may be an update according to an additional version of a schema applicable to the data object from an existing version of a schema. The data object may be provided by one component of a distributed system. A trigger event may be detected to send the data object to a different component of the distributed system. The data object may be translated from the additional version to the existing version and sent to the different component.

20 Claims, 9 Drawing Sheets

(56) References Cited

U.S. PATENT DOCUMENTS

| | | | |
|---|---|---|---|
| 2006/0200488 A1 | 9/2006 | Chu-Carroll et al. | |
| 2011/0173168 A1* | 7/2011 | Jones ...................... | G06F 16/88 |
| | | | 707/802 |
| 2013/0047066 A1* | 2/2013 | Lee .......................... | G06F 16/93 |
| | | | 715/229 |
| 2014/0227976 A1* | 8/2014 | Callaghan ........... | H04L 12/1859 |
| | | | 455/41.2 |
| 2015/0269198 A1* | 9/2015 | Cornish ................ | G06F 16/211 |
| | | | 707/806 |
| 2017/0262441 A1* | 9/2017 | Horowitz .............. | G06F 16/215 |
| 2018/0329931 A1* | 11/2018 | Baid ...................... | G06F 16/213 |
| 2022/0179645 A1* | 6/2022 | Doddadalivatta Venkatesh | |
| | | Prasad ...................... | G06F 8/65 |
| 2022/0244949 A1* | 8/2022 | Iqbal ...................... | G06F 9/547 |

OTHER PUBLICATIONS

Terwilliger James, et al., Bidirectional by Necessity: Data Persistence and Adaptability for Evolving Application Development, Generative and Transformational Techniques in Software Engineering (GTTSE 2011), Lecture Notes in Computer Science (LNCS 7680) 2013, pp. 219-270, Springer-Verlag Berlin Heidelberg.

Herrmann, Kai, et al., Logical Data Independence in the 21st Century—Co-Existing Schema Versions with InVerDa, arxiv.org, Aug. 19, 2016, pp. 1-12, Cornell University Library, 201 Olin Library Cornell University Ithaca, NY.

* cited by examiner

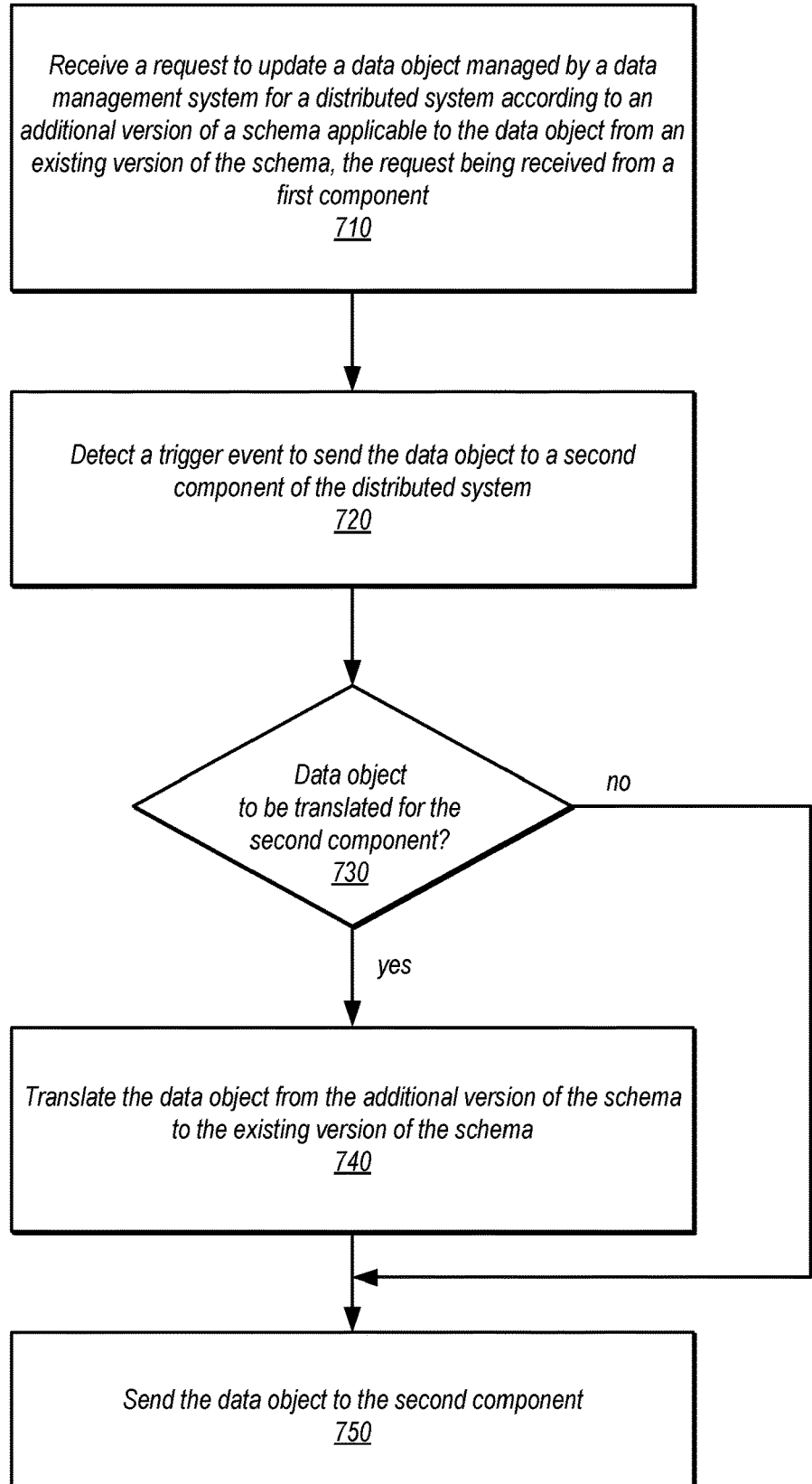

*Receive a request to update a data object managed by a data management system for a distributed system according to an additional version of a schema applicable to the data object from an existing version of the schema, the request being received from a first component*
710

*Detect a trigger event to send the data object to a second component of the distributed system*
720

*Data object to be translated for the second component?*
730 no yes

*Translate the data object from the additional version of the schema to the existing version of the schema*
740

*Send the data object to the second component*
750

*FIG. 7*

TRANSLATING BETWEEN VERSIONS OF DATA OBJECT SCHEMAS FOR DATA PRODUCERS AND DATA CONSUMERS

BACKGROUND

Distributed systems utilize different components to support different operations. As the number of operations grows, the number of interactions between components including data exchanges grows. Such growth can lead to increasingly complex interactions which may be difficult to understand when making modifications to the data exchanged or used between multiple components.

BRIEF DESCRIPTION OF THE DRAWINGS

FIG. 7 is a high-level flowchart illustrating various methods and techniques that implement translating between different versions of data object schemas for data producers and data consumers, according to some embodiments.

Figure 1:
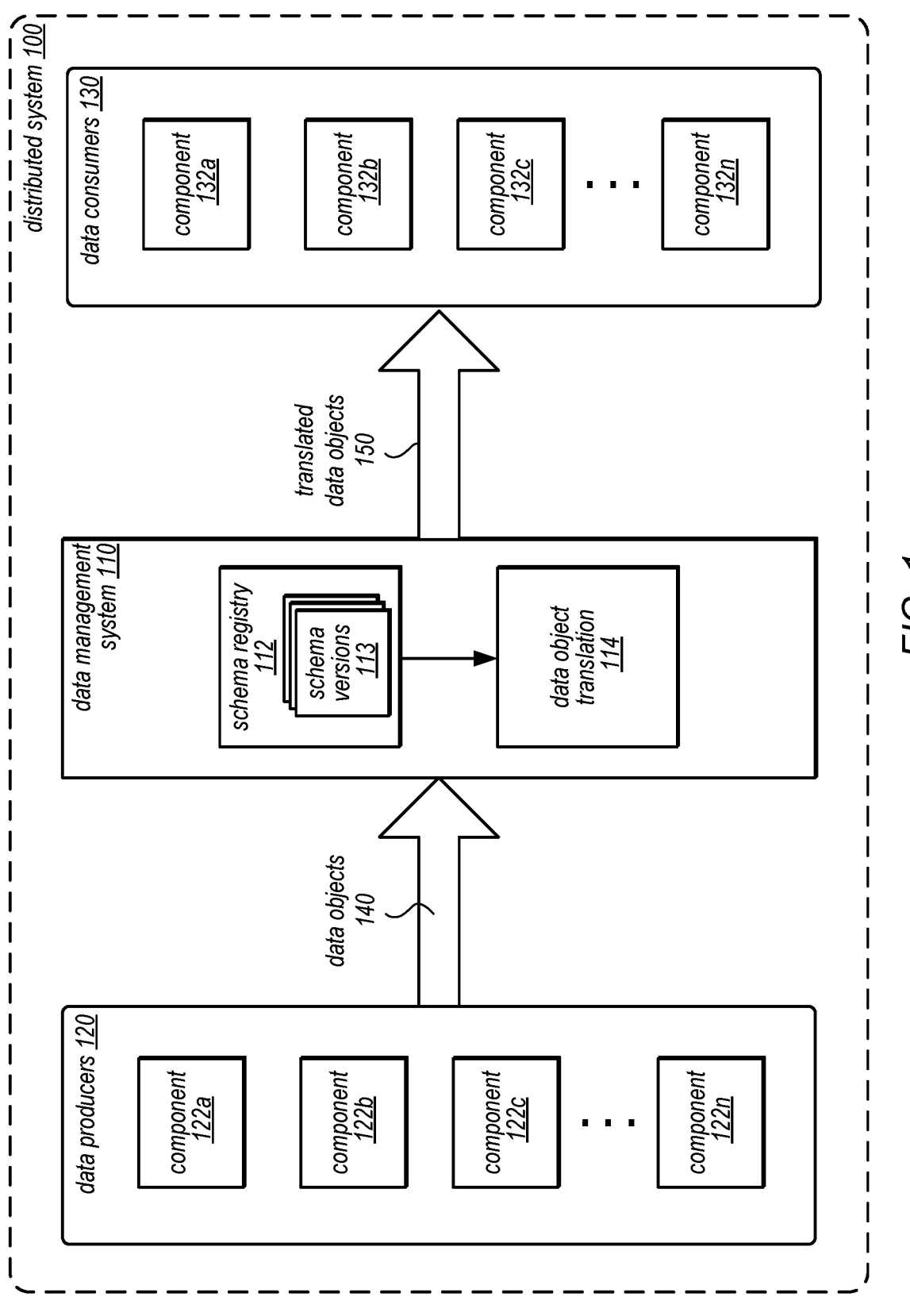
FIG. 1 is a block diagram illustrating translating between different versions of data object schemas for data producers and data consumers, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for translating between different versions of data object schemas for data producers and data consumers are described. Different systems or applications, such as an application development, build, delivery, and deployment service as discussed in detail below, utilize many different components to support different operations. As part of the performance of these operations, data may be exchanged between components. For instance, in a system like the application development, build, delivery, and deployment service discussed below, many different documents and other data objects may authored, updated, and utilized. In order to provide a consistent communication technique between components while support the ability to add, modify, or update components, different versions of schemas for data objects may be received and enforced.

For example, in some embodiments, a data object (e.g., various data structures, files, records, or other data used to perform applications or authorized as part of the execution of an application (e.g., by a user) may be used. A schema may describe the various requirements imposed upon the data object (e.g., various data fields, metadata, length, data types, location, etc.) which may be used to make the data object conform to the expectations of different components that read the schema. Because changes to components (or the addition of components) may make use of different or modified forms of data objects, different versions of schemas may be supported. In this way, a different version of a schema can be used to support a new or modified component. As discussed below, a data management system that enforces and translates between components, can support extensions to and modifications of distributed system components without breaking, degrading, or interrupting the performance of other applications.

FIG. 1 is a block diagram illustrating translating between different versions of data object schemas for data producers and data consumers, according to some embodiments. Distributed system 100 may include various components, such as components 122a, 122b, 122c, 122n, 132a, 132b, 132c, and 132*n*, which may perform various operations. As part of these operations, data may be exchanged between the components as data producers 120 and data consumers 130. For some operations a component may be a producer, and in other operations the component may be a consumer so roles are not fixed), as discussed in detail below with regard to FIG. 3.

As discussed above, a data management system may be implemented to facilitate the exchange of data by storing (and/or transmitting) data guaranteed to conform to a schema associated with the data object. In order to support different versions of schemas, when data objects 140 are provided by data producers 120, data management system 110 may utilize a schema registry 112 storing schema versions 113, which may be used to perform data object translation 114 by applying various operations, transformations, or other modifications to data of a data object (e.g., various columns, fields, cell values, structures, etc.). Schema versions 113 may include instructions to perform translation (or be used to determine instructions for translation, in some embodiments.

As discussed below with regard to FIGS. 3 and 8, different schema versions 113 may be registered and associated with data objects. In this way, translated data objects 150 can be provided to those data consumers 130 that use the data object but rely upon a different version of the schema for the data object (e.g., an older version). Schema translation prevents schema changes from breaking or disrupting other component operations, improving the performance of distributed system 100 overall. For example, additional features added to one component (e.g., a newer version of a development tool) which include additional data (or reformatted data) of a data object can be added to that data object, as a different component that relies upon the data object using a different feature will not be able to interact with that object due to the additional changes.

Please note, FIG. 1 is provided as logical illustrations of schema version translation, and is not intended to be limiting as to the physical arrangement, size, or number of components, modules, or devices to implement such features.

The specification first describes an example network-based application development, build, deployment and delivery service that performs translating between different versions of data object schemas for data producers and data consumers. Included in the description of the example network-based application development, build, deployment and delivery service are various aspects of the example network-based application development, build, deployment, and delivery service. The specification then describes flow-charts of various embodiments of methods for translating between different versions of data object schemas for data producers and data consumers. Next, the specification describes an example system that may implement the disclosed techniques. Various examples are provided throughout the specification.

Figure 2:
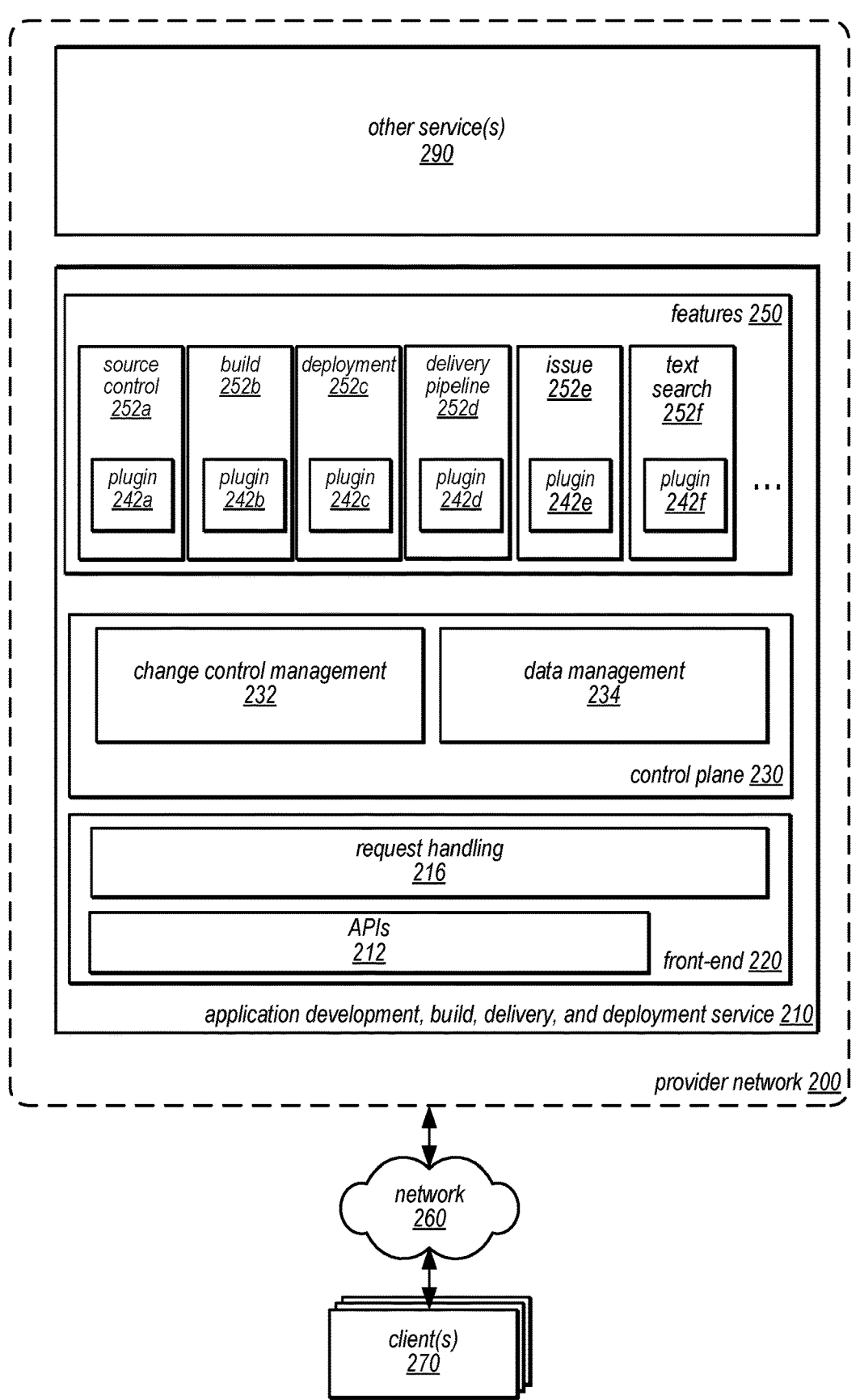
FIG. 2 is a block diagram illustrating a provider network that may implement an application development, build, deployment, and delivery service that implements translating between different versions of data object schemas for data producers and data consumers, according to some embodiments.

FIG. 2 is a block diagram illustrating a provider network that may implement an application development, build, deployment, and delivery service that implements translating between different versions of data object schemas for data producers and data consumers, according to some embodiments. Provider network 200 may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, such as clients 105 in FIG. 1, may be attached to the overlay network so that when a client 105 provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-6, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes"

view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate with the tools to expose their functionality to end users. The platform services include a web UI framework based on a micro-frontend architecture and a shared API layer. Application development, build, delivery, and deployment service 210 may implement a data management system to facilitate data sharing across tools—and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications Text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232 and data set management 234. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance, as discussed in detail below with regard to FIG. 4.

As noted earlier, plugins may include plugins 242a, 242b, 242c, 242d and 242e, which may bused to access various development tools, such as features 250, including but not limited to source control 252a, build 252b, deployment 252c, delivery pipeline 252d, issue handling 252e, and text search 252f, which is discussed in detail below with regard to FIGS. 5-8. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for a interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced—in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252f may be a subscriber to various documents events that add, delete, or modify documents in order to make corresponding updates to inverted indexes.

Figure 3:
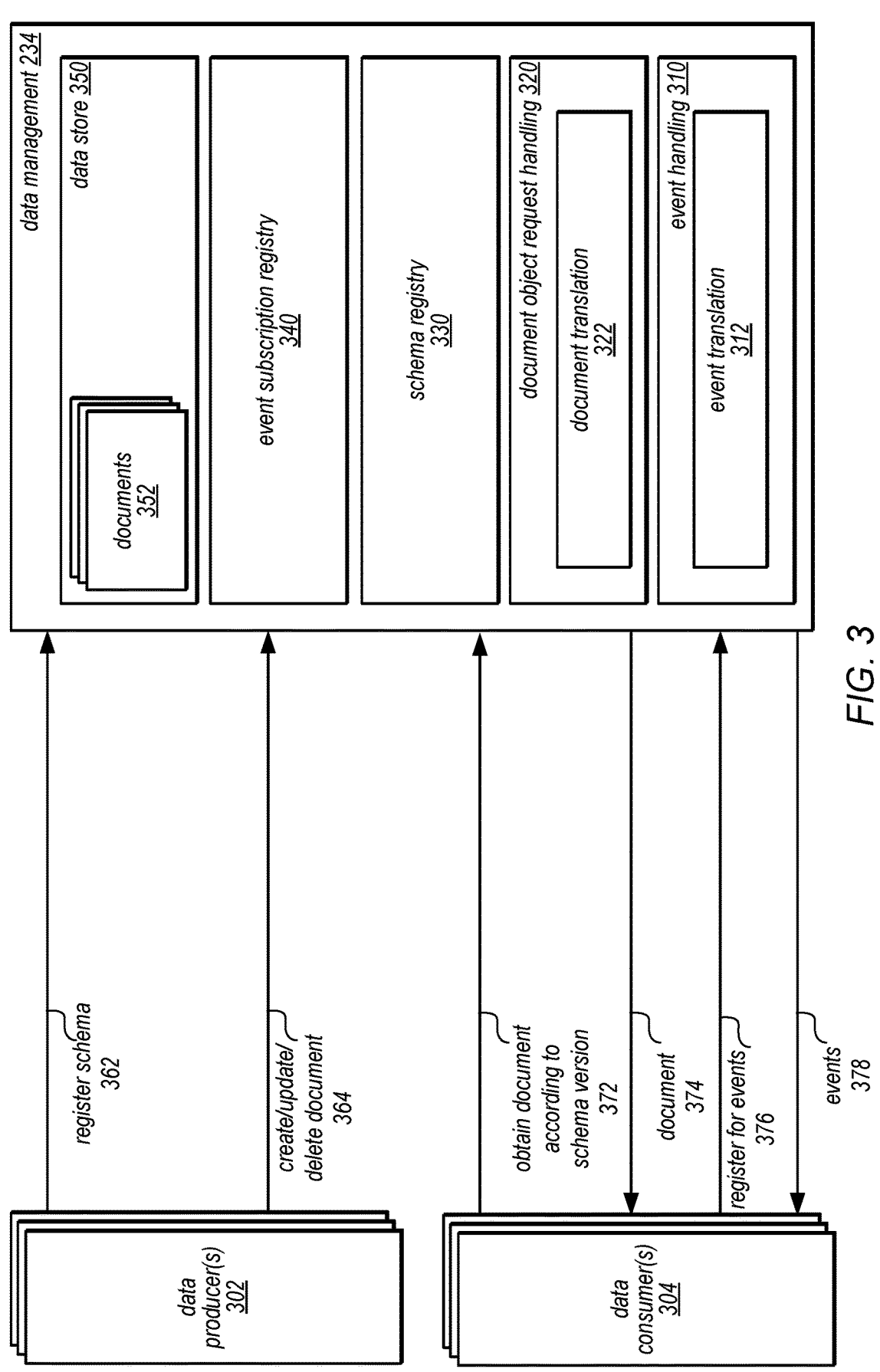
FIG. 3 is a block diagram illustrating an example data management system for the application development, build, deployment, and delivery service, according to some embodiments.

FIG. 3 is a block diagram illustrating an example data management system for the application development, build, deployment, and delivery service, according to some embodiments. Data management 234 may implement different types of request handling. Event handling 310 may perform event translation as part of handling different events, as discussed in detail below with regard to FIG. 6. Document object request handling 320 may perform document translation 322 as part of handling different document object requests, as discussed in detail below with regard to FIG. 5. Schema registry 330 may provide storage for different schema versions, translation instructions and other schema information. Event subscription registry 340 may support storage for data consumers to register for events. Data store 350 may store data for data objects, such as documents 352 and event streams (not illustrated).

Data producers may submit various requests, as discussed in detail below with regard to FIGS. 4-8, including registering a schema 362, creating, updating, or deleting a document, as indicated at 364, creating an event stream, or submitting events. Data consumers may submit various requests and receive various responses, as discussed in detail below with regard to FIGS. 4-8, including requests to obtain a document according to a schema version, as indicated at 372, receive the document 374, register for events, as indicated at 376, and receive events, as indicated at 378.

Figure 4:
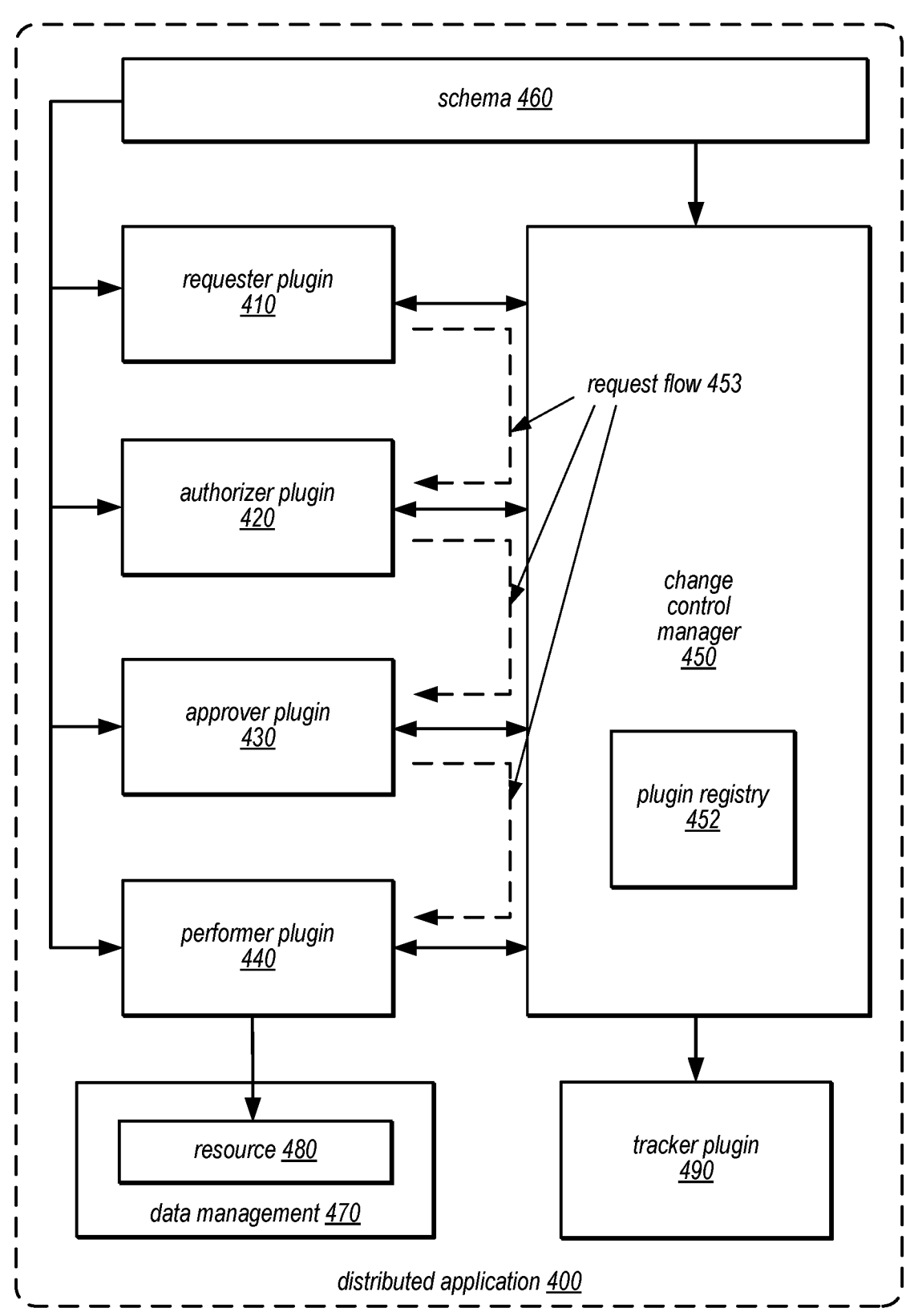
FIG. 4 is a block diagram illustrating change control management, according to some embodiments.

FIG. 4 is a block diagram illustrating extensible change control management, according to some embodiments. Distributed application 400, such as an application that utilizes various plugin components to integrate, support, and extend the capabilities of the distributed application 400, may include a change control manager 450 which may implement changes to a resource 480 stored in data management 470 using various plugins 410, 420, 430 and 440, in some embodiments, identified in plugin registry 452. Plugin registry 452 may be a registry for a single resource (or organized to group registered plugins by resource) in a data structure (e.g., table, index, etc.). The resource 480 may be of a particular resource type, with the resource type having an associated schema 460. Various change operations for the resource 480 may be encoded using the schema 460, and the various plugins 410, 420, 430 and 440 as well as the change control manager 450 may access the schema 160 during communication of these operations.

A requester plugin 410 may submit requests for changes to the resource to change control manager 450. These requesters may, in some embodiments, provide various user interfaces (UIs) or Application Programming Interfaces (APIs) or other programmatic interfaces to allow users to submit change requests to the change control manager. In other embodiments, a requester plugin may perform other plugin roles for the resource of for other resources and may submit change requests as part of fulfilling other plugin roles. These examples, however, are not intended to be limiting, and any number of requester plugin implementations may be envisioned.

An authorizer plugin 420 may approve or reject change requests submitted to the change control manager 450 by requester plugins. An approver plugin 430 may approve or reject change requests submitted to the change control manager 450 by requester plugins. A given resource may have any number of registered approver plugins in plugin registry 452, in various embodiments.

A performer plugin 440 may perform approved change requests submitted to the change control manager 450 by requester plugins. In some embodiments, a plugin may implement more than one plugin function for a resource or the same or different plugin functions for different resources. For example, in some embodiments, a plugin may implement both an approver plugin function as well as a performer plugin function for a resource, as discussed below. It should be understood, however, that some combinations of plugin functions may not be allowed, for example, a plugin implementing both a requester function and an approver function for the same resource. These examples, however, are not intended to be limiting and any number of plugin implementations may be imagined.

In addition, a tracking plugin 490 may receiving notifications of various events associated with the resource 480. A change performer plugin component 440 may advertise possible changes and reference the projected consequences to a resource 480 stored within data management 470.

For example, a performer plugin 430 may advertise a change to merge a pull request with the consequence that the tip of the destination branch will change. Change approver plugin 430 may be required to record approval in change control manager 450 before a change can proceed. For example, if it is desirable to use an advisory time window plugin, that plugin would have to approve changes to deployed environments before they are enacted—a time window plugin would reject changes that take place during an advisory period. Change approver plugins 430 can pre-approve a change where applicable. For example, when evaluating whether a user can merge a pull request, in most cases it is not necessary to wait for a user to actually request the merge to determine if it is allowed. Change requester plugin 410 may start the process of enacting a change.

These requester plugins could be client plugins that provide user interfaces (UIs) that make these requests on behalf of end users but they could also be feature plugins. For example, a delivery pipeline plugin (e.g., plugin 242d as shown below in FIG. 2) could be a change requester 410 and initiate changes to each target resource according to its orchestration rules instead of directly performing these changes itself. Finally, change performers 440 complete the process by enacting approved changes and recording the results in change control manager 150 and data management 470. Plugins may perform combinations of these roles, but it may be rare, in some scenarios, for a plugin to perform multiple roles for the same type of change for example, it is not expected that a plugin will be an approver for its own changes.

As noted earlier, provider network 200 may be implemented across multiple different regions. In some embodiments, application development, build, delivery, and deployment service 210 will offer customers a single pane of glass to manage their releases to multiple provider network 200 regions. At the same time application development, build, delivery, and deployment service 210 will have a presence in multiple provider network 200 regions for hosting toolchain resources. To achieve this, users may be able to choose a home region when they create an organization in application development, build, delivery, and deployment service 210. A routing layer in the front end may be implemented that will route requests to the regional stack of application development, build, delivery, and deployment service 210 where the user's toolchain resources are homed. Each regional stack of application development, build, delivery, and deployment service 210 may aggregate data from deployment resources in multiple provider network 200 regions, in some embodiments. A primary/secondary failover mechanism for toolchain resources may be implemented to help users remain productive during single-region provider network 200 outages. In some embodiments, cross-region replication may be implemented to bring data (such as source code repositories or artifacts) closer to end users when they are far from the home region. This model offers high durability for toolchain resources, a path to reasonable performance for globally distributed teams, and architectural simplicity (avoiding known problems with multi-primary solutions).

Figure 5:
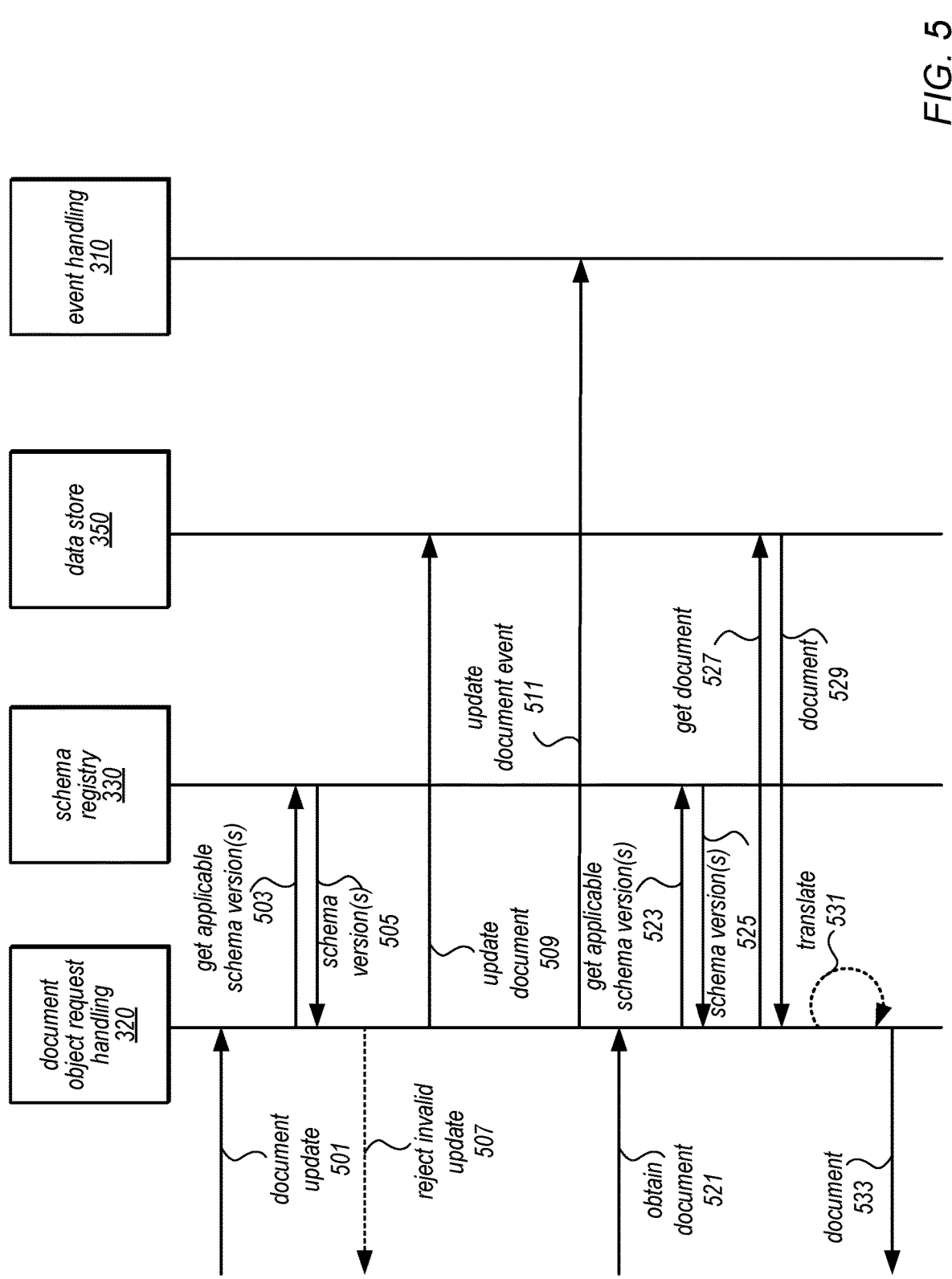
FIG. 5 is a sequence diagram illustrating document translations between versions of a schema, according to some embodiments.

FIG. 5 is a sequence diagram illustrating document translations between versions of a schema, according to some embodiments. Document object request handling 320 may receive document update requests, such as update request 501 (e.g., to create, modify, or delete a document object). Document object request handling 320 may send a request 503 to get applicable schema version(s) from schema registry 330. Schema registry 330 may identify the applicable schema versions (e.g., from mapping information) or may identify them from identifiers in the request 503. Schema registry may return the schema version(s) 505 to document object request handling. Document object request handling 320 may use the schemas to determine the update fails to satisfy the schema(s), such as failing to satisfy a current version of the schema. If so, then a rejection of the update as invalid may be sent, as indicated at 507. Document object request handling 320 may then send a request to data store 350 to update the document according to the request, as indicated at 509. Document object request handling 320 may also send a notification of an update document event to event handling 310.

As indicated at 521, document object request handling 320 may handle requests to obtain documents. Object document request handling 320 may get the applicable schema versions, as indicated at 523 from schema registry 330, as indicated at 525. Object request handling may also get the document, as indicated at 527 from data store 350, as indicated at 529. If translation should be performed, then translation instructions may be used, as indicated at 531, and the document sent, as indicated at 533.

Similar techniques to those depicted with regard to document update 501 can be performed to create a new document. For example, a create document request can be received at document object request handling 320, which include information, such as a file (or location thereof), or other information used to create the document. Again, document object request handling 320 may get applicable schema version(s) 320 so that document object request handling 320 can determine which schema version to apply to create the document. For example, the document may one of many documents that are created according to the same schema. Which schema version is applied may correspond to which plugin (e.g., which tool or other feature) submitted the document creation request. Mapping information may, for example, be used to determine which schema version is applicable to which requestor. In some embodiments, the request itself may specify the schema version. Document object request handling 320 may then store the document to data store 350. An event may be triggered or sent to event handling 310.

Figure 6:
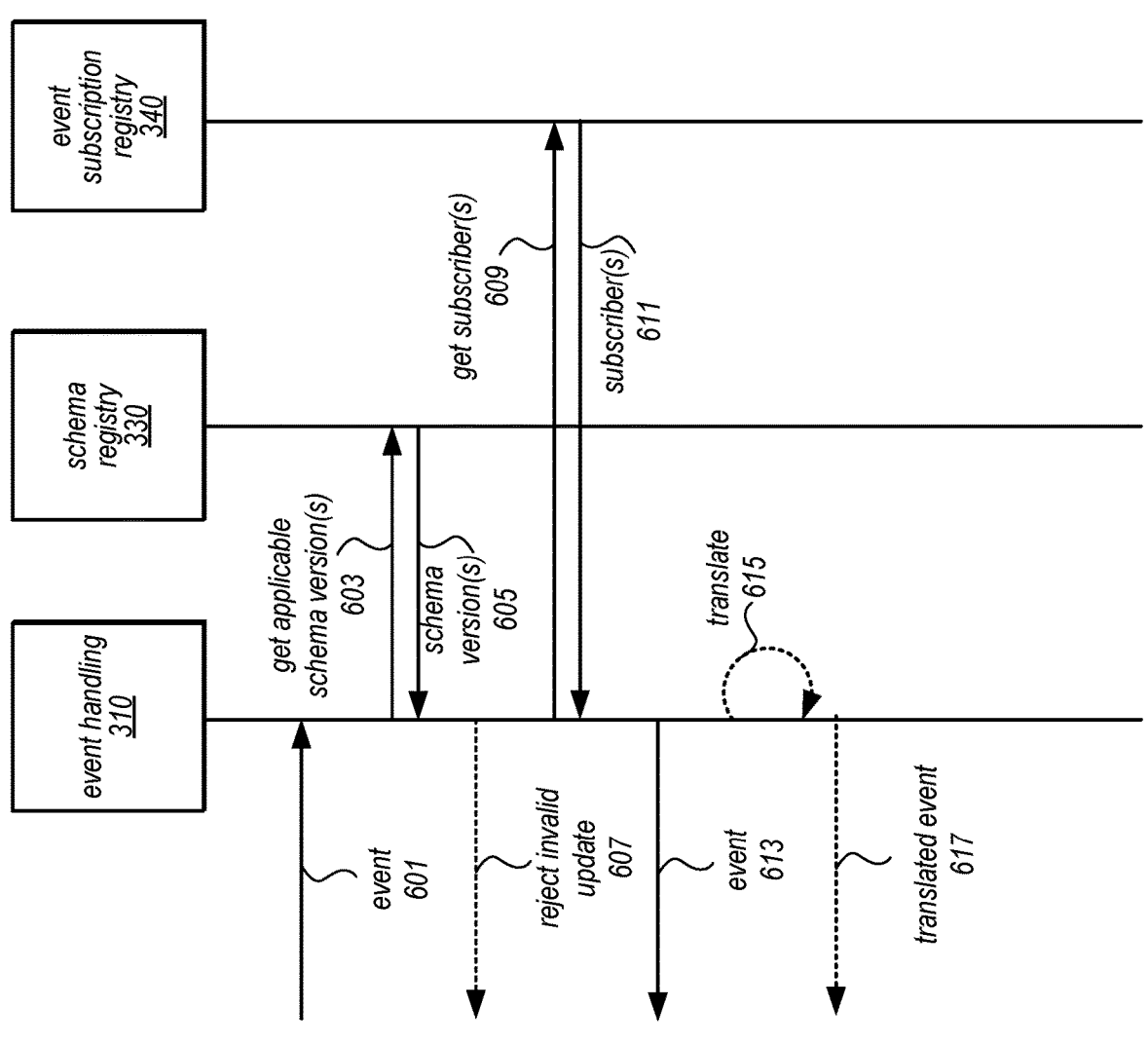
FIG. 6 is a sequence diagram illustrating event translations between versions of a schema, according to some embodiments.

FIG. 6 is a sequence diagram illustrating event translations between versions of a schema, according to some embodiments. Events, such as event 601, may be received either from their submission to data management 234 as part of an event stream or as an event related to a document update or creation (as noted above). Event handling 310 may send a request 603 to get applicable schema(s) 603 for the event to schema registry 330. Schema registry may identify the applicable schemas (e.g., based on mapping information) or may return those schema(s) identified in the request 603 (e.g., by version and schema identifier). The schemas may be returned, as indicated at 605.

Event handling 310 may use the schemas to evaluate the validity of the event. If the event does not satisfy the schema(s), then it may be rejected, as indicated at 607. If valid, event handling 310 may send a request to event subscription registry to get 609 subscribers for the event (e.g., subscribers to an event stream or document). Event subscription registry 340 may return 611 the subscribers. Event handling 310 may determine, based on the subscribers, whether translation should be performed (e.g., does an event subscription have a schema version identifier matching the event, or an earlier schema). If translation should not be performed, then event 613 is sent. If translation should be performed, then translation 615 may be performed using translation instructions between schemas and the translated event sent, as indicated at 617.

The application build, development, delivery, and deployment service 210 discussed in FIGS. 2 through 6 provide examples of a system that may implement translating between different versions of data object schemas for data producers and data consumers. However, various other types of distributed services, applications, or other systems may implement such techniques as well, which may provide a common data exchange without limiting the extensibility or adaptability of the distributed system for new or updated features.

FIG. 7 is a high-level flowchart illustrating various methods and techniques that implement translating between different versions of data object schemas for data producers and data consumers, according to some embodiments. Various different systems and devices may implement the various methods and techniques described below, either singly or working together. For example, an application development, build, delivery, and deployment service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 710, a request may be received to update a data object management by a data management system for a distributed system according to an additional version of a schema applicable to the data object from an existing version of the schema, the request being received from a first component. For example, the update request may be a request to update a data object, as discussed above with regard to FIGS. 3 and 5, or may be an event of an event stream, as discussed above with regard to FIGS. 3 and 6. The component may be any number of microservices, servers, separately hosted systems, or other components (e.g., tools as discussed above with regard to FIG. 2).

Although not illustrated, in some embodiments, an update may be rejected if the requested changes are invalid or do not otherwise conform to the schema. For example, a backward compatibility requirement may be enforced with respect to schema changes, such that each schema change may have to be able to be derived from a later schema (e.g., data field can be added, broken apart, or enriched but not removed). In some embodiments, various stylistic or other constraints on updates may be enforced. An update that fails to satisfy the additional schema version or be unable to satisfy (with translation) any other existing schema version may be rejected, in some embodiments.

As indicated at 720 a trigger event may be detected to send the data object to a second component of the distributed system. For example, as discussed above with regard to FIG. 5, a trigger event may be a request to read a document object. In another example, a trigger event may be an event received as part of data object that is an event stream or an event triggered in response to an update to a document object, as discussed above with regard to FIG. 6.

As indicated at 730, a determination may be made as to whether the data object should be translated. For example, the request to read the data object may include a schema version and/or identifier, which may indicate the version of schema expected. For an event, an event stream subscription may indicate the schema version or identifier. As indicated at 740, when translation is to be performed, the data object may be translated from the additional version of the schema to the existing version of the schema. For example, translation instructions may be accessed, in some embodiments, in order to determine how to modify data to fit the existing version (e.g., data type changes, data field combinations, data field removals, etc.). In some embodiments, translation instructions may be generated by performing a schema comparison (e.g., using a different identification tool) and then the translation instructions may be created to effect the identified differences.

Once translated (or not if no translation is determined, as indicated by the negative exit from 730), the data object may be sent to the second component, in some embodiments. For example, a network identifier, interface (e.g., plugin as discussed above with regard to FIG. 2) or other protocol may be identified and used to send the data object.

Figure 8:
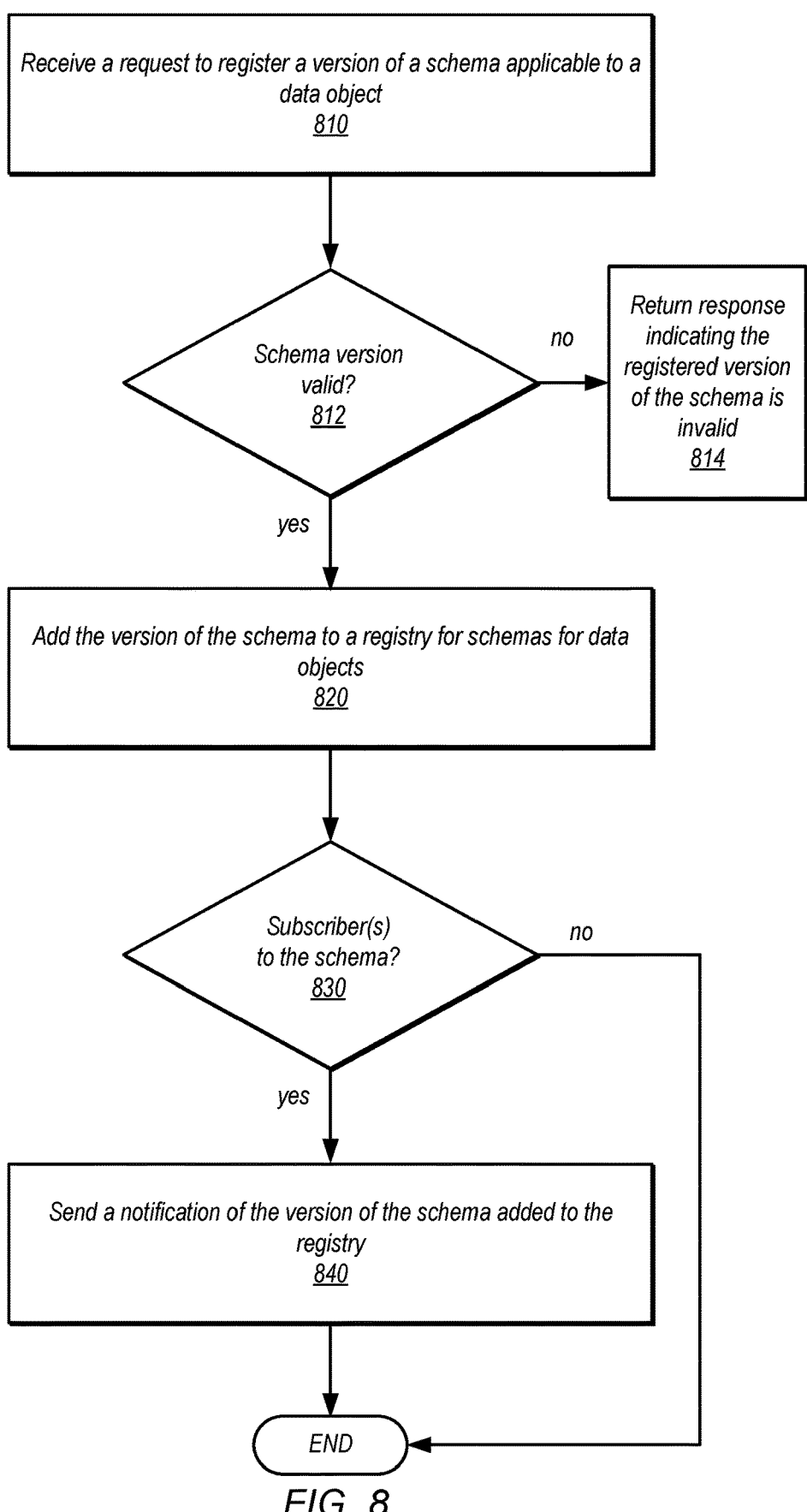
FIG. 8 is a high-level flowchart illustrating various methods and techniques that implement registering a version of a schema for translation, according to some embodiments.

FIG. 8 is a high-level flowchart illustrating various methods and techniques that implement registering a version of a schema for translation, according to some embodiments. As indicated at 810, a request may be received to register a version of a schema applicable to a data object, in some embodiments. For example, an interface of a data management system, like data management system 110 or 234, may support registration requests (e.g., via API, graphical user interface, command line interface, and so on), in order to provide a new version of a schema (e.g., specified as a JSON or other script, programming code, or language) with an associated data object (e.g., a document or event stream). In some embodiments, the schema may include or link to instructions (e.g., scripts, programming code, or language) for translating between the version of the schema being registered and one or more prior versions of the schema (e.g., describing what data field was added, changed, removed, etc.).

The registration request may be rejected as indicated at 812, in some embodiments, if the request or updated schema fails a validation technique, such as analysis indicating that the version of the schema fails to conform to various stylistic or other constraints on schemas (e.g., using invalid data types). As indicted by the negative exit from 812, a response indicating that the registered version of the schema is invalid may be returned.

As indicated at 820, the version of the schema may be added to a registry for schemas for data objects, in some embodiments. For example, a database or other data storage system may store a schema as a document, file, or other object. A link, mapping, or other association may be updated to identify which data object(s) (e.g., event stream or document) the schema is applicable to (e.g., a version number, a schema identifier and data object identifiers).

For some components, the addition of schema versions may provoke corresponding updates or opportunities for updates. In some embodiments, a subscription registry (or the schema registry) may indicate whether subscribers to changes to the schema exist, as indicated at 830. If so, then as indicated by the positive exit, a notification of the version of the schema added to the registry may be sent, as indicated at 840. For example, an email address, or other electronic communication protocol may be used, an update description may be posted, an alarm or other event may be triggered, and so on.

Figure 9:
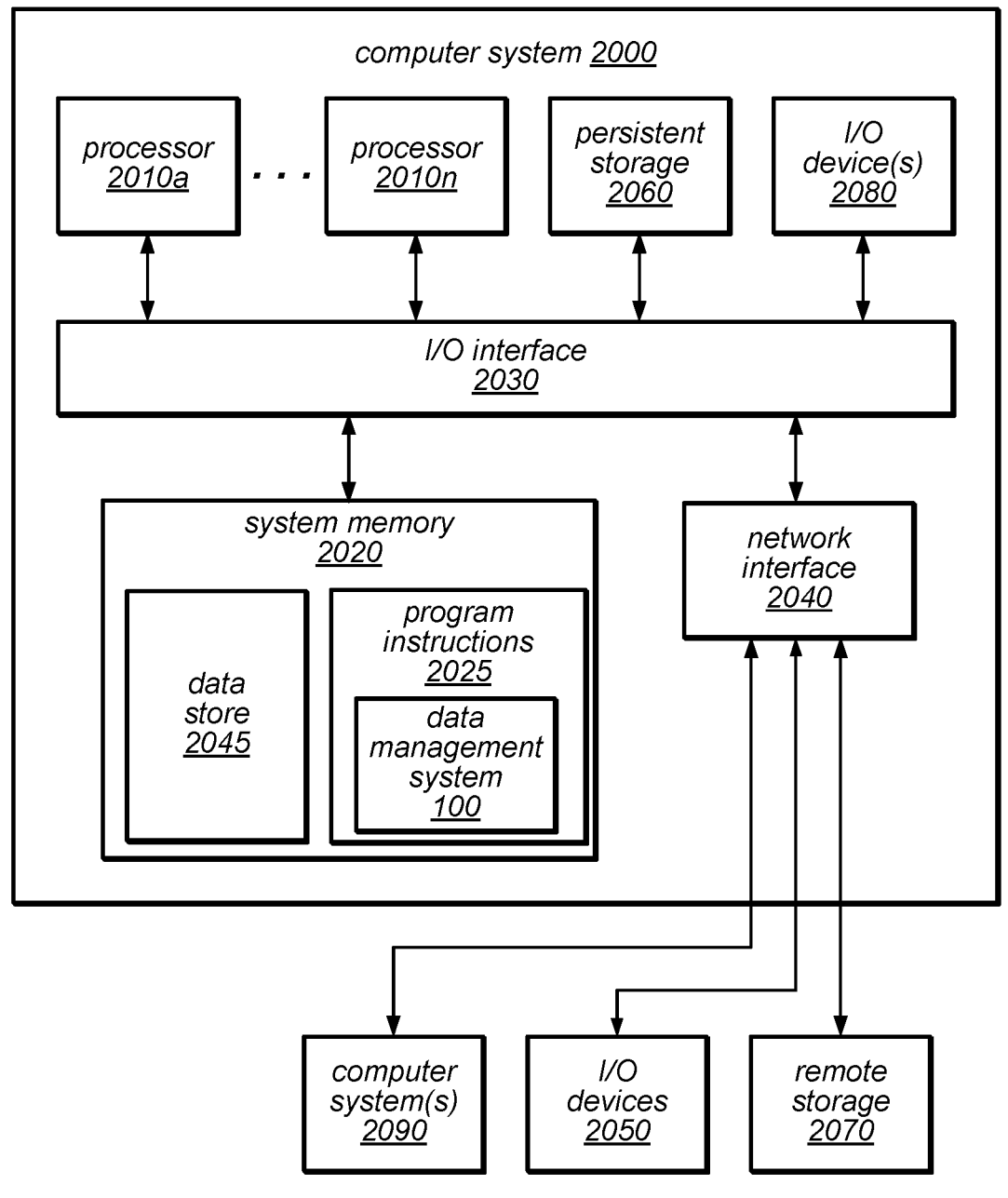
FIG. 9 is a block diagram illustrating an example computer system, according to various embodiments.

Any of various computer systems may implement translating between different versions of data object schemas for data producers and data consumers as discussed with regard to the various figures above. FIG. 9 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 9 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for data management system 110, for the downloadable software or provider network are shown stored within system memory 2020 as program instructions 2025, which may implement various embodiments described above, such as data management system 100. In some embodiments, system memory 2020 may include data store 2045 which may be configured as described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   at least one processor; and
   a memory, storing program instructions that when executed by the at least one processor, cause the at least one processor to implement a data management system of a control plane for an application development, build, delivery and deployment service, the data management system configured to:
   receive a request to register a second version of a schema applicable to a data object in a schema registry for the data management system, wherein a first version of the schema for the data object is included in the registry;
   receive a request to update the data object managed by the data management system according to the second version of the schema registered for the data object from the first version of the schema registered for the data object, wherein the request to update the data object is received from a first component of the application development, build, delivery and deployment service;
   use first one or more requirements specified in the first version of the schema and second one or more requirements specified in the second version of the schema to determine that the update to the object in the request satisfies both the first version of the schema and the second version of the schema based, at least in part, on the data management system being able to translate between the second version of the schema and a first version of the schema, before performing the update to the data object;
   receive a second request to update the data object managed by the data management system according to the second version of the schema registered for the data object from the first version of the schema registered for the data object, wherein the second request to update the data object is received from the first component of the application development, build, delivery and deployment service;
   use the first version of the schema to determine that the update to the object in the second request fails to satisfy the first version of the schema;
   use the second version of the schema to determine that the update to the object in the second request fails to satisfy the second version of the schema;
   reject the second request to update the data object according to a determination that the update to the object in the second request fails to satisfy more than one version of the schema, including the first version of the schema and the second version of the schema;
   after receipt of the request to update the data object according to the second version of the schema,
      detect a trigger event to send at least a portion of the data object managed by the data management system to a second component of the application development, build, delivery and deployment service according to the first version of the schema;
   responsive to detecting the trigger event:
      access the registry to obtain instructions to translate the data object from the second version of the schema to the first version of the schema; and
      send at least the portion of the translated data object to the second component.

2. The system of claim 1, wherein the determination that the second request to update the data object fails to satisfy more than one version of the schema is based on a backward compatibility requirement.

3. The system of claim 1, wherein the data management system is further configured to:
   detect a second trigger event to send at least some portion of the data object to a third component of the application development, build, delivery and deployment service according to the second version of the schema;

responsive to the detection of the second trigger event:
send the at least some of the data object to the third component.

4. The system of claim 1, wherein the first component and the second component are different tools supported by the application development, build, delivery and deployment service.

5. A method, comprising:
receiving, by a data management system for an application development, build, delivery and deployment service, a request to update a data object managed by the data management system according to a second version of a schema applicable to the data object from a first version of the schema applicable to the data object, wherein the request to update the data object is received from a first component of the application development, build, delivery and deployment service;

using first one or more requirements specified in the first version of the schema and second one or more requirements specified in the second version of the schema to determine that the update to the object in the request satisfies both the first version of the schema and the second version of the schema with translation before performing the update to the data object;

receiving a second request to update the data object managed by the data management system according to the second version of the schema registered for the data object from the first version of the schema registered for the data object, wherein the second request to update the data object is received from the first component of the application development, build, delivery and deployment service;

using the first version of the schema to determine that the update to the object in the second request fails to satisfy the first version of the schema;

using the second version of the schema to determine that the update to the object in the second request fails to satisfy the second version of the schema;

rejecting the second request to update the data object according to a determination that the update to the object in the second request fails to satisfy more than one version of the schema, including the first version of the schema and the second version of the schema;

after receiving the request to update the data object according to the second version of the schema, detecting, by the data management system, a trigger event to send at least a portion of the data object managed by the data management system to a second component of the application development, build, delivery and deployment service according to the first version of the schema;

responsive to detecting the trigger event:
translating the data object from the second version of the schema to the first version of the schema; and
sending at least the portion of the translated data object to the second component.

6. The method of claim 5, wherein the determination that the second request to update the data object fails to satisfy more than one version of the schema is based on a backward compatibility requirement.

7. The method of claim 5, wherein the data object is stored in a data store of the data management system.

8. The method of claim 5, wherein the trigger event is a request to read the data object.

9. The method of claim 5, wherein the trigger event is performance of the update to the data object.

10. The method of claim 5, further comprising:
receiving, at the data management system, a request to register the second version of the schema applicable to the data object; and
adding the second version of the schema to a registry for schemas.

11. The method of claim 10, wherein the second version of the schema includes one or more instructions to translate the data object to the first version of the schema from the second version of the schema.

12. The method of claim 5, further comprising:
receiving, at the data management system, a request to create a second data object; and
creating, by the data management system, the second data object according to the second version of the schema instead of the first version of the schema.

13. The method of claim 5, further comprising:
detecting, by the data management system, a second trigger event to send at least some portion of the data object to a third component of the application development, build, delivery and deployment service according to the second version of the schema;
responsive to detecting the second trigger event:
sending the at least some of the data object to the third component.

14. One or more non-transitory, computer-readable storage media, storing program instructions that when executed on or across one or more computing devices cause the one or more computing devices to implement:
receiving, by a data management system for an application development, build, delivery and deployment service, a request to update a data object managed by the data management system according to a second version of a schema registered for the data object from a first version of the schema registered for the data object, wherein the request to update the data object is received from a first component of the application development, build, delivery and deployment service;

using first one or more requirements specified in the first version of the schema and second one or more requirements specified in the second version of the schema to determine that the update to the object in the request satisfies both the first version of the schema and the second version of the schema before performing the update to the data object;

receiving a second request to update the data object managed by the data management system according to the second version of the schema registered for the data object from the first version of the schema registered for the data object, wherein the second request to update the data object is received from the first component of the application development, build, delivery and deployment service;

using the first version of the schema to determine that the update to the object in the second request fails to satisfy the first version of the schema;

using the second version of the schema to determine that the update to the object in the second request fails to satisfy the second version of the schema;

rejecting the second request to update the data object according to a determination that the update to the object in the second request fails to satisfy more than one version of the schema, including the first version of the schema and the second version of the schema;

after receiving the request to update the data object according to the second version of the schema, detecting, by the data management system, a trigger event to send at least a portion of the data object managed by the data management system to a second component of the application development, build, delivery and deployment service according to the first version of the schema;

responsive to detecting the trigger event:

accessing a registry that includes instructions to translate the data object from the second version of the schema to the first version of the schema; and sending at least the portion of the translated data object to the second component.

15. The one or more non-transitory, computer-readable storage media of claim 14, wherein the determination that the second request to update the data object fails to satisfy more than one version of the schema is based on a backward compatibility requirement.

16. The one or more non-transitory, computer-readable storage media of claim 14, wherein the trigger event is a request to read the data object.

17. The one or more non-transitory, computer-readable storage media of claim 14, wherein the trigger event is performance of the update to the data object.

18. The one or more non-transitory, computer-readable storage media of claim 14, wherein the data object is a document object, and wherein the request to update the data object updates the document object.

19. The one or more non-transitory, computer-readable storage media of claim 14, storing further instructions that when executed on or across the one or more computing devices, cause the one or more computing devices to implement:

receiving, at the data management system, a request to register the second version of the schema applicable to the data object; and adding the second version of the schema to a registry for schemas.

20. The one or more non-transitory, computer-readable storage media of claim 14, wherein the first component and the second component are different tools supported by the application development, build, delivery and deployment service.

* * * * *